Dec. 14, 1965  J. P. LINDSEY  3,223,966
SEISMIC CORRECTIONS
Filed Sept. 17, 1962  3 Sheets-Sheet 1
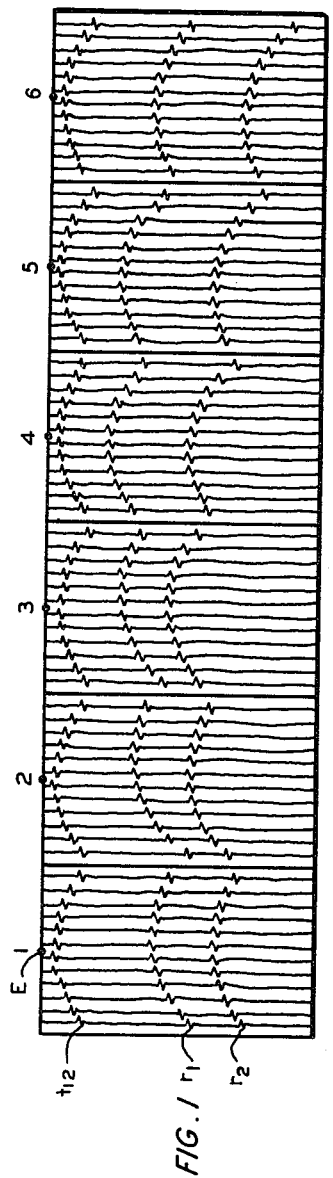
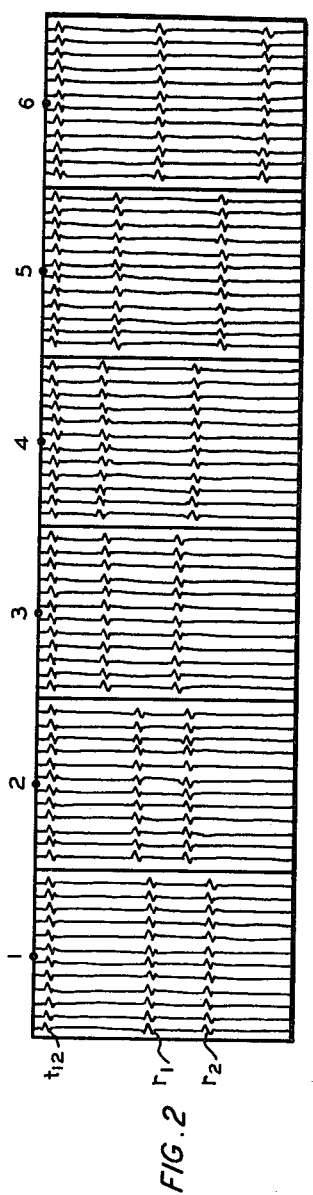
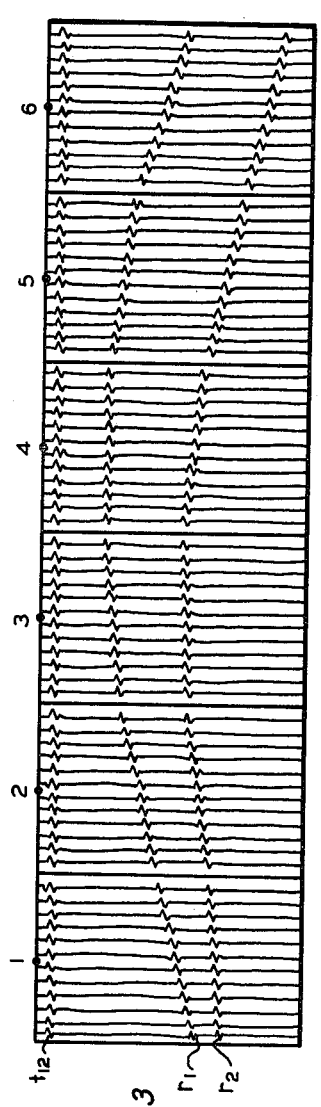
INVENTOR.
J. P. LINDSEY
BY Young E. Quigg
ATTORNEYS INVENTOR.
J.P. LINDSEY
BY Young & Quigg
ATTORNEYS Dec. 14, 1965    J. P. LINDSEY    3,223,966
SEISMIC CORRECTIONS
Filed Sept. 17, 1962    3 Sheets-Sheet 3

INVENTOR.
J. P. LINDSEY
BY Young & Quigg
ATTORNEYS

United States Patent Office 3,223,966
Patented Dec. 14, 1965

3,223,966
SEISMIC CORRECTIONS
Joe P. Lindsey, Bartlesville, Okla., assignor to Phillips
Petroleum Company, a corporation of Delaware
Filed Sept. 17, 1962, Ser. No. 224,055
2 Claims. (Cl. 340—15.5)

This invention relates to reflection seismology. In another aspect, it relates to a method and apparatus for making seismic record sections from time corrected seismograph records.

Reflection seismology and the production of seismograph records has been and is being actively developed in the art of geophysical exploration to locate subterranean strata. The seismograph record (or seismogram) will usually consist of a plurality of traces longitudinally arranged in parallel relationship, each trace representing the seismic signals detected by a single seismometer. The seismograph records are examined and interpreted to locate and determine the nature of geological structures below the earth's surface, such as the depth and dip of subterranean reflecting beds. It is a common practice to place the successive seismograph records side by side to produce a profile or seismic record section which "paints a picture" of the cross section of the geological strata beneath a seismic profile line. However, in order to interpret the geophysical data of the seismograph record and the seismic record section, it first becomes necessary to correct the time alignment of the individual traces of the seismograph record. The times of arrival of the elastic waves from the shotpoint to the different seismometers vary with the horizontal or surface distance between the shotpoint and seismometers. This variation or difference in time across the seismograph record is referred to as normal moveout (sometimes as angularity of path) and is a dynamic error which tends to obscure alignments of corresponding signals along traces. Another time alignment correction which is often made is that due to topographic effects such as variations in the elevation of the shotpoint and seismometers and the existence of a weathered layer at the earth's surface, these effects introducing static errors in the time alignment of seismic events on the traces.

A recent advance in the time alignment correction of seismograph records is that disclosed and claimed in copending application Serial No. 123,231 filed July 11, 1961, by Raymond G. Piety et al. (assigned to Phillips Petroleum Company of Bartlesville, Oklahoma, which is also the assignee of the subject application). While the invention of said copending application advantageously removes from the seismograph records the differences in time of reflection events between adjacent tracings caused by normal moveout, elevational, and weathered layer effects, it also removes the time relationship pertaining to the physical attitude of the reflecting beds. As such, when the time corrected seismograph records, after suitable processing to enhance the value of the signals, are placed side by side to form a seismic record section, the attitude of reflecting beds is not shown on the record section. Thus, the recorded information of such seismic record sections is often difficult to resolve and interpret, where poor reflection quality exists and where complex geological conditions prevail, under which situations the attitude of reflecting beds is obscure.

Accordingly, an object of this invention is to improve the reflection seismology technique by increasing the readability of seismograph records. Another object is to provide an improved method and apparatus for imparting to time corrected seismograph records the time relationships pertaining to the physical attitude of subterranean reflecting beds, making such seismograph records particularly suitable for forming seismic record sections. Another object is to improve the invention disclosed and claimed in said copending application Serial No. 123,231. Further objects and advantages of this invention will become apparent to those skilled in the art from the following discussion, appended claims and accompanying drawings in which:

FIGURE 1 is a schematic view of seismic record section made by placing a plurality of successive uncorrected seismograph records side by side;

FIGURE 2 is a schematic view of another seismic record section of the same geological section made from a plurality of time corrected seismograph records;

FIGURE 3 is a schematic view of a seismic record section of this invention of the same geological section, showing the physical attitude of subterranean reflecting beds;

Briefly, I propose to restore the physical attitude of subterranean reflecting beds to processed seismic traces (which have been corrected for normal time as measured from shotpoint, e.g., by the technique disclosed in said copending application Serial No. 123,231) by recording said seismic traces onto recording media, establishing a normal time for each processed seismic trace as measured from each of a plurality of seismometer stations, moving the transcribing stations from their recording position a distance corresponding to the difference between the normal time of each seismic trace as measured from the shotpoint and the normal time of each seismic trace as measured from each of the seismometer stations and passing the recording media past said plurality of transcribing stations whereby the time occurrence of the seismic events on said seismic traces will be the normal times as measured from the seismometer stations which recorded said seismic events.

In the method and apparatus of said copending application Serial No. 123,231, time corrections of seismograph records are made by a novel mechanical analog of the "time triangle" familiar to geophysicists, whereby the arrival times of recorded reflection events are shifted into time alignment on each trace of the record in a controlled manner. Some description of the method and apparatus of said copending application will be given here in order to provide a background and setting for the improvement of this invention, but reference is made to said copending application for a complete description thereof.

Figure 4:
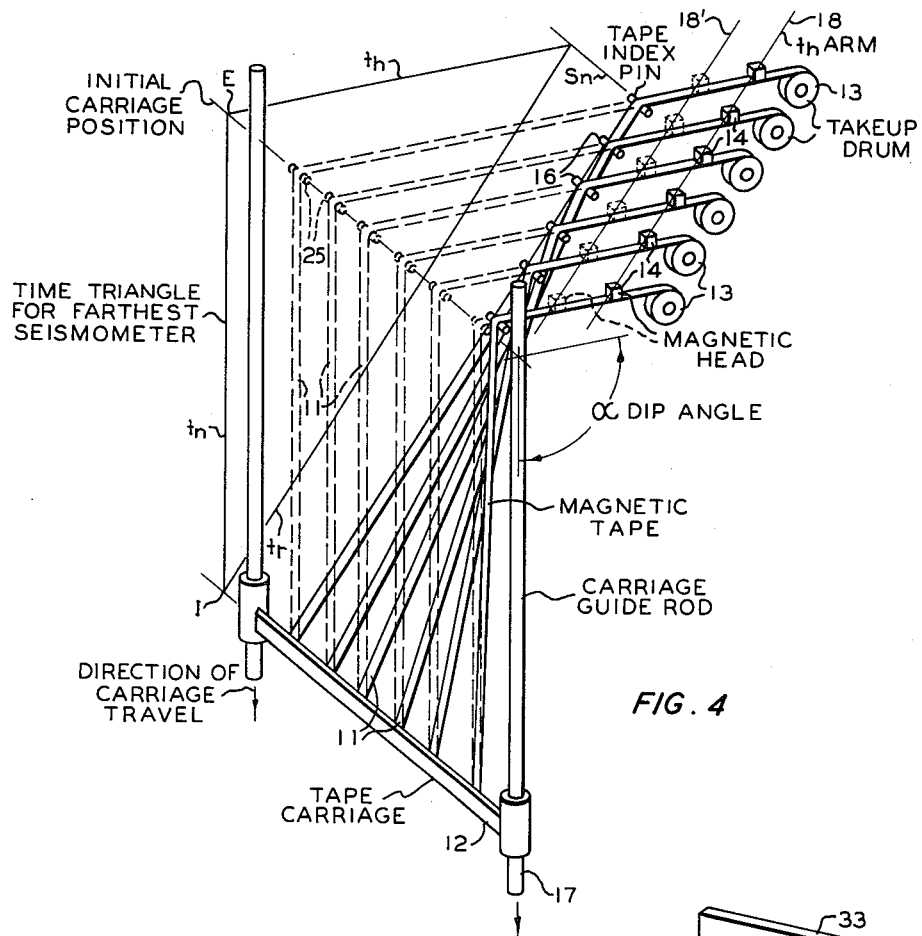
FIGURE 4 is a schematic view of a multichannel analog corrector with features of this invention associated therewith.

Referring initially to FIGURE 4, a plurality of magnetic tapes 11, each containing the trace (channel) of an adjacent seismometer (transcribed onto the tape from the field seismograph record), are attached at their initial time ends to a tape carriage 12 which is adapted to move at a constant speed in one direction. The other ends of the tapes are attached to tape takeup drums 13. As the tape carriage 12 starts at the indicated initial carriage position and travels uniformly downward, the tapes 11 will move across magnetic transcribing heads 14, and thence over tape index pins 16, allowing the seismic data to be reproduced. Since each tape 11 has a dimension in time units, the portion of it between pin 16 and carriage 12 represents the time from shotpoint E to reflected to seismometer $S_n$ (or from shot image I to seismometer $S_n$), and can represent the leg $t_r$ of the time triangle familiar to geophysicists. The distance between the initial carriage position and the tape index pin 16 represents the horizontal time from shotpoint E to seismometer station $S_n$, or leg $t_h$ of the time triangle, and the distance between the initial carriage position and the tape carriage represents the normal time from shotpoint E to reflector and back to shotpoint, or leg $t_n$ of the time triangle. The resulting non-uniform tape velocity across the transcribing head 14 will cause the time of playout of reflection events to be equivalent to normal time $t_n$ rather than reflection time $t_r$ since the location of the transcribing head and tape 11 are such that reproduced events are advanced by an amount equal to $\Delta t$, the normal moveout time correction. Of course, each of the time triangles of FIGURE 4 has a common $t_n$ dimension and a multiplicity of $t_h$ dimensions. Since the same average velocity function holds for practically every trace, the $t_h$ function associated with the farthest seismometer station can be scaled downward for each of the other seismometer stations, thereby simplifying the problem of generating the $t_h$ motions required for the multiplicity of time triangles. When the reflecting bed is tilted or dipped, an appropriate change in the time triangle must be made to maintain the mechanical analog. This is accomplished by changing the angle between the $t_h$ and $t_n$ legs of the triangle from 90°. The amount of change is equal to the dip angle $\alpha$. The corners of the time triangles illustrated in FIGURE 4 represented by tape index pins 16 are the only corners that are not common; however, these corners are related positionally in the same way that the seismometer stations are related. So, if index pins 16 are coupled in such a way that movement of the pin for the farthest seismometer stations also moves the other pins in proportion, all the $t_h$ dimensions of each time triangle are maintained in proper proportion, and thus all of the six time triangles are generated simultaneously with a downward motion of carriage 12.

There are two basic phases in the time alignment operation of the multichannel device illustrated in FIGURE 4. First, the seismic field data displayed are reproduced in such a manner that each trace of the seismogram is transcribed onto an individual magnetic tape of the analog corrector of this invention. Then, the data on the individual magnetic tapes are played off in such a way that the required time corrections are accomplished. To transcribe the field data onto the individual magnetic tapes of the analog device, all of the index pins 16 (which are attached to transcribing heads 14) are positioned at the initial carriage position. This means that the $t_h$ arm 18 coupled indirectly to the index pins 16 is positioned so that the $t_h$ dimension is zero. In this condition, the tape carriage is started and moves uniformly downward as each channel of seismic data is recorded on its respective tape. No change in the time alignment of reflection events is produced by the recording of the tapes in this phase.

To play back the data thus recorded on the individual magnetic tapes, the tape carriage 12 is returned to its initial starting position and the $t_h$ arm 18 is swung out to a position corresponding to the $t_h$ value desired at time zero. As the tape carriage 12 is started and moved uniformly downward, the $t_h$ arm 18 is moved in such a way that the proper value of $t_h$ is maintained at all times for all channels. When the playout made in this phase is examined, all reflection events will be time-aligned if the proper $t_h$ occurred at the reflection normal time $t_n$. It is also necessary that the plane containing the $t_n$ dimensions be set at the correct angle. If the reflections are from a subsurface horizon that has zero dip, the $t_h$ plane must be at exactly 90° with respect to the plane of travel of the tape carriage. For other than zero dip angle of the reflecting bed, the $t_h$ plane must be accordingly tilted and then the data played out to achieve the time alignment of the reflection events.

Figure 5:
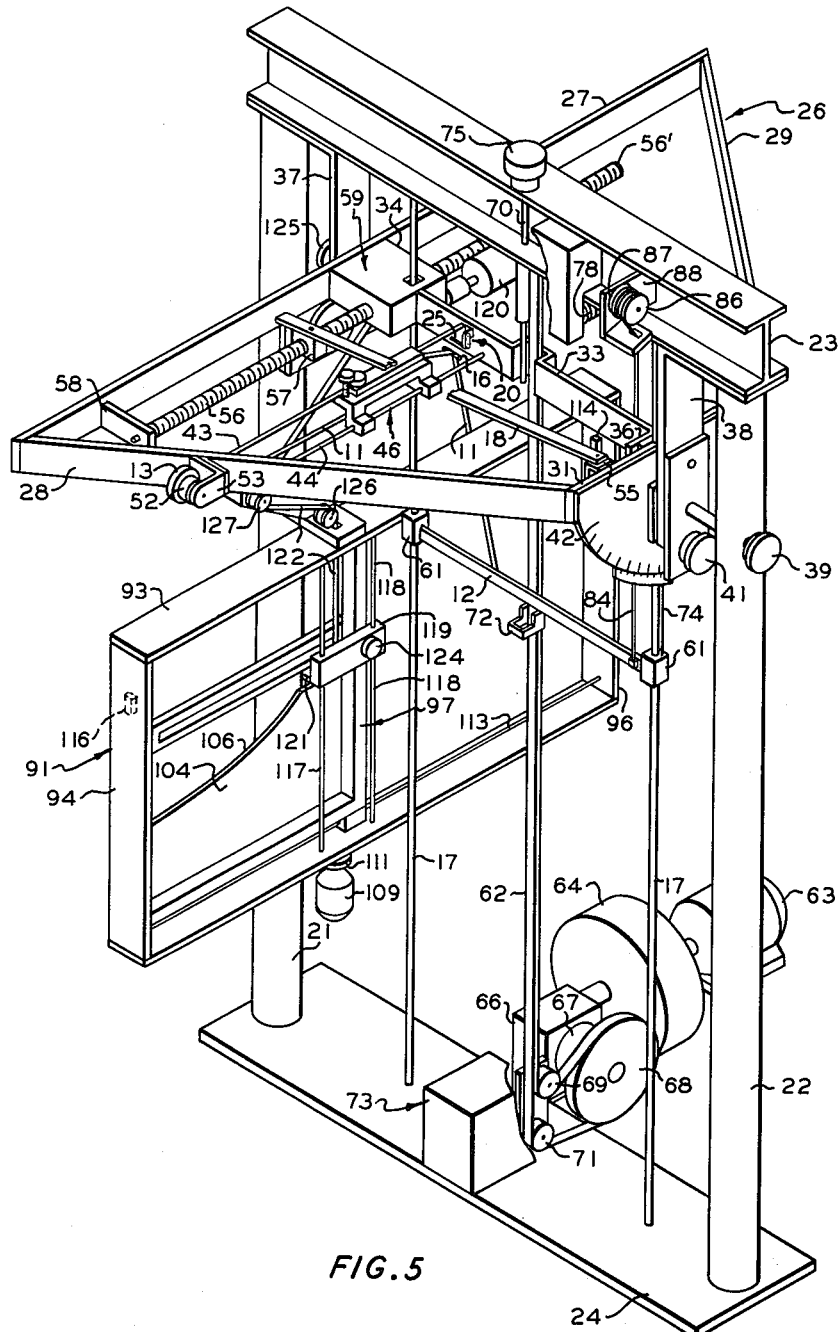
FIGURE 5 is an isometric view of a mechanical analog corrector with the improved features of this invention associated therewith.

FIGURE 5 illustrates a preferred embodiment of the tape analog corrector of said copending application, with features of this invention associated therewith. Pivotally supported between standards 21, 22 at the upper ends thereof is a frame generally designated 26, which may be referred to as the $t_h$ plane or dip plane. The frame 26 is pivotal about its horizontal axis and preferably braced along this axis by brace 33. The frame 26 can be pivoted around its horizontal axis by means of a dip adjustment knob 39. Once the appropriate dip angle is found, the frame 26 can be locked in this position by means of a lock 41, and a dip angle dial 42 used to note the appropriate dip angle.

Figure 6:
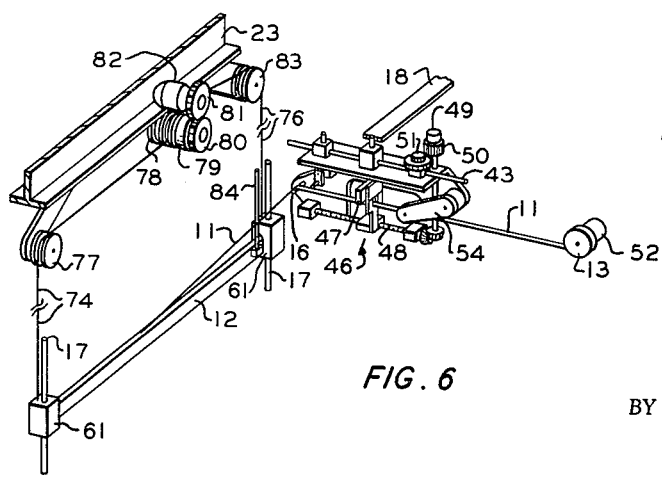

Frame 26 is provided with a plurality of carriage rods, only one pair 43, 44 of which are shown, which run across the long dimension of the frame and normal to its axis (brace 33). Each pair of carriage rods 43, 44 supports and facilitates the movement of a magnetic head carriage, only one of which is shown and generally designated 46. The carriage 46, as shown in more detail in FIGURE 6, is provided with an index pin 16 and the position of magnetic head 47 with respect to index pin 16 can be changed by moving the magnetic head along lead screw 48 by turning knob 49, the extent of this adjustment being indicated by dials 50, 51. In this way, static corrections for elevational and weathered layer effects can be made. A magnetic tape 11 is associated with each of the magnetic head carriages 46, one extremity of the tape being attached to a tape takeup drum 13 driven by suitable spring motor 52, this latter assembly being secured by a bracket 53 to frame member 28. The magnetic tape 11 is threaded through the magnetic head carriage 46, coming in contact with magnetic head 47 and passing over a pin attached to flutter damper 54 and then over index pin 16. In a similar manner, the frame 26 can be provided with a plurality of other magnetic head carriages, one set on one side of the axis of frame 26 representing seismometers on one side of the shotpoint and the other set of magnetic head carriages on the other side of the axis representing a set of seismometers on the other side of the shotpoint. As shown in FIGURE 5, each magnetic head carriage 46 is attached to and moveable with a $t_h$ bar 18, which is pivoted on a frame member 55. The free end of the $t_h$ bar 18 is attached to a screw 56 by suitable bracket 57, this screw hereinafter called the $t_h$ screw. One extremity of the $t_h$ screw 56 is mounted in a bracket 58 and the other extremity passes through yoke 34 into a gear box generally designated 59, the operation of which will be described subsequently.

The other end of each of the magnetic tapes 11 is secured to tape carriage 12 which is disposed to move in a vertical plane passing through the axis of frame brace 33. Tape carriage 12 is provided with guides 61 on either extremity and rides along a pair of vertical guide rods 17. Adjacent the vertical plane in which the tape carriage 12 is disposed is a steel band 62 which is adapted to move continuously at a fixed rate. The steel band 62 is driven by an assembly comprising a synchronous motor 63, a viscous coupled inertial damper 64, speed reducer 66, magnetic clutch 67, bull wheel 68, and suitable rollers 69, 71 at the bottom of the belt and rollers at the top of the belt, the latter rollers not being shown in the interest of brevity. The tape carriage 12 is provided with suitable latch 72 which is adapted to grip the steel band 62 so as to enable the carriage to be pulled downwardly by the steel band. Depending from cross beam 23 is a rod 70 which is adapted to be actuated by means 75 comprising a solenoid, rod 70 functioning to trip latch 72 when carriage 12 is in its initial or uppermost position. At the lower end of the carriage path the latch 62 is decoupled from the steel band by automatic means 73. As shown in FIGURE 6, the carriage guides 61 are preferably attached to carriage return strings 74, 76. String 74 passes upwardly through yoke 36 of FIGURE 5 and over roller 77 and is attached at its upper end to capstan 78, having two spiral grooves, which is provided with a clutch 79 and gears 80, 81 driven by motor 82. String 76 passes through yoke 34 and over roller 83 and is attached to capstan 78 at its upper end. When the carriage 12 reaches its lower extremity and is decoupled from the steel band 62, means 73 automatically activates the motor 82 in the carriage return assembly, whereupon the carriage is returned automatically to its initial position just below brace 33.

Also affixed to the tape carriage 12, preferably by one of the guides 61 thereof, is a magnetic tape 84 (FIGURE 5) which serves as a reference timing tape and is used to provide timing marks on each run of the device for a check of its proper operation and timing accuracy. The upper end of this timing tape 84 is wound around a tape takeup drum 86 driven by spring motor 87, this assembly being attached by suitable bracket 88 to cross beam 23.

Disposed below frame 26 is another frame generally designated 91. Longitudinally moveable within the frame 91 is a template carriage generally designated 97 and vertically mounted within carriage 97 is template (or cam) 104, hereinafter referred to as the velocity template. This template 104 is provided at its upper end with a profile surface 106. The horizontal dimension of template 104 is proportional to seismic record time and the vertical dimension of the template being proportional to the $t_h$ for the fastest seismometer. The bottom of carriage 97 is provided on one side with a longitudinal rack and pinion which is driven by a suitable motor 109 having magnetic clutch 111. Carriage 97 is adapted to move longitudinally within frame 91 along guide bars such as 113. Carriage 97 is moved from its starting position, as shown in FIGURE 5, by motor 109, and when it reaches the end of its path of travel, at a position adjacent frame member 96, it trips a limit switch 114; accordingly, motor 109 is reversed and carriage 97 returned to its starting position. When carriage 97 reaches the latter position, it trips limit switch 116, causes the clutch 111 to disengage and the reversal of motor 109.

At a point intermediate the ends of frame 91 are a pair of rods 117, 118 upon which is mounted for vertical movement a program head 119. The latter is provided with a pin 121 sticking out from one side and resting upon the profile surface 106 of template 104. When carriage 97 moves, the program head 119 is pulled down by spring motors, pin 121 in effect sliding along profile surface 106. Passing through program head 119 is a linkage tape 122 the lower end of which is wound around a takeup drum disposed within head 119. The slack in tape 122 can be taken up by a linkage adjuster 124. The tape 122 is thus, in effect, tied at one end to program head 119. The other end of tape 122 passes up through the top member 93 of frame 91 and over a pair of rollers 126, 127 and finally to a gear mechanism 59. Mechanism 59 is adapted to translate the longitudinal motion of linkage tape 122 into a rotational motion to rotate $t_h$ screw 56. Thus, as carriage 97 moves within frame 91, program head 119 falls, thereby pulling linkage tape 122 and causing the rotation of the $t_h$ screw 56. As the $t_h$ screw 56 rotates, $t_h$ bar 18 is pivoted about bracket 55, causing the various magnetic head carriages 46 to move in consort toward the pivotal axis (brace 33) of frame 26. Screw 56' is also rotated but in the opposite direction, to cause the movement of the magnetic head carriages (not shown) on the opposite side of brace 33. A suitable motor in gear mechanism 59 is adapted to pull the program head 119 back to its starting position after a run has been made. A knob 125 and a dial are associated with the upper end of tape 122; this permits adjustment of the $t_h$ arm 18 and provides a means for indicating the $t_h$ positions of the magnetic heads and the vertical position of pin 121 on profile surface 106.

In the time alignment operation of the tape analog corrector shown in FIGURES 5 and 6, seismic field data is first transcribed onto the individual magnetic tapes 11. This can be accomplished by using a magnetic recorder to play the data from one field magnetic tape (containing, for example, 24 traces) and transcribe each trace onto a corresponding magnetic tape 11. In making this transcription, all of the index pins 16 of the magnetic head carriages 46 and the tape carriage 12 are positioned at the initial carriage position (shown in FIGURE 4 by a broken line). All of the static and dynamic corrections are set at zero. With steel band 62 moving at a constant speed, solenoid 75 is energized to cause rod 70 to trip carriage latch 72. Accordingly, tape carriage 12 is fastened to steel band 62 and is moved downward therewith. Carriage 12 pulls the tapes across the magnetic heads 47, thereby recording each trace of seismic data from the field tape onto a corresponding magnetic tape 11. At the same time, carriage 12 pulls reference timing tape 84 downwardly, this tape having already recorded thereon timing marks which are used to check the operation and time accuracy of the recording later on when the transcribed data on tapes 11 are played off. No change in the time alignment of reflection events is produced by the recording of the tapes 11 in this phase of operation. When carriage 12 reaches the lower end of its path of travel, at which point all of the field data has been transcribed on tapes 11, latch 72 is automatically decoupled from steel band 62 by automatic means 73, the latter also activating the carriage return assembly shown in FIGURE 6 to return carriage 12 to its initial carriage position. Upon such return, spring motors 52 wind up the slack in tapes 11 on takeup drums 13.

The tapes 11 now have recorded thereon the seismic data corresponding to that of the field tape. Before playing back the data from tapes 11, appropriate corrections are introduced into the device so that the arrival times of the recorded reflection events are shifted into time alignment on each tape in a controlled manner. These corrections are accomplished, after making the appropriate settings, directly in the playback operation.

With tape carriage 12 in its initial position, $t_h$ arm 18 is manipulated by knob 125 to swing the $t_h$ arm out to a position corresponding to the $t_h$ value desired at time zero. Since the $t_h$ value will be different for each seismometer on one side of the shotpoint, the relative position of each of the index pins 16 with respect to the initial carriage position (shotpoint E) will be different. At time zero, pin 121 is set at a corresponding position on the velocity profile surface 106 of template 104 and the slack in linkage tape 122 is taken up by linkage adjuster 124, template carriage 97 being placed at its initial position adjacent frame member 94. Another correction which can be introduced before starting the playback operation is that due to static errors. Introduction of this correction is accomplished by manipulating knob 49 (FIGURE 6) to adjust the relative position of each magnetic head with respect to its index pin 16.

When said corrective settings have been introduced, solenoid 75 is actuated and clutch 111 of template carriage motor 109 is engaged, so that tape carriage 12 is started downwardly simultaneously with the lateral movement of template carriage 97 from its starting position. As tape carriage 12 moves downwardly with steel band 62, $t_h$ arm 18 is moved (as a result of the translation of the longitudinal motion of linkage tape 122 to rotational motion of $t_h$ screw 56, as pin 121 drops along profile surface 106) to introduce the proper value of $t_h$ for all tape channels. At the lower end of the path traveled by tape carriage 12, latch 72 is decoupled and the tape carriage returns to its starting position in the same manner as in the record operation. Simultaneously, template carriage 97 at the furthermost point in its lateral path trips limit switch 114, causing the reversal of motor 109, the return of the template carriage to its initial position, the return of $t_h$ bar 18 to its starting position, and the return of program head 119 to its starting position. When tape carriage 12 reaches its initial starting position, clutch 79 is disengaged, and when template carriage 97 reaches its initial starting position it trips limit switch 116 to disengage clutch 111.

During the playback operation just described, whereby the time of transcription of seismic events is equivalent to normal time as measured from shotpoint, the signals from the magnetic heads 47 can be recorded on a single magnetic tape, the individual traces thereof having their reflection events in proper time alignment. Alternatively, said signals can be displayed on an oscilloscope and examined visually.

The playback operation can be repeated by changing the angle of frame 26 for each run. For example, when frame 26 is at 90° with respect to the plane of travel of tape carriage 12, the played out seismic signals are assumed to be those of subsurface horizons with zero dip. By releasing lock 41 and manipulating knob 39, the dip angle of frame 26 can be changed, after which lock 41 is again tightened to maintain the frame at the new dip angle during the next playback operation. The dip angle can be repeatedly changed, preferably every 3°, from −35° to +35°, to determine the dip angles of subsurface horizons, if they in fact exist.

The time corrected seismograph records thus produced by the mechanical analog method and device of said copending application Serial No. 123,231 can be processed by any suitable technique to enhance the signal values thereof, and then used to form seismic record sections. A suitable processing technique is disclosed in U.S. Patent No. 2,907,400, issued October 6, 1959 to T. W. Swafford, Jr., though I prefer to use the processing technique disclosed in copending application Serial No. 155,113, filed November 27, 1961 by J. P. Lindsey et al.

A time corrected seismic record section made from a plurality of time corrected seismograph records 1, 2, 3, etc. is illustrated in FIGURE 2, along with a seismic record section of FIGURE 1 of the same geological profile made from a plurality of successive uncorrected seismograph records. The first signals (at the top of each trace) represent the instant of shot explosion (E) such as $t_{12}$. Signals which represent those of reflecting beds are designated $r_1$ and $r_2$. T comparison of these two seismic record sections shows that the seismic record section of FIGURE 2 is definitely an improvement over the seismic record section in FIGURE 1, in that there is some discernibility in the seismic record section in FIGURE 2 of the attitude of two reflecting beds, indicated by adjacent signals $r_1$ and $r_2$. There still is some difficulty, however, in clearly identifying the physical attitude of reflecting beds of the seismic record section of FIGURE 2. There will now be described how the instant invention improves upon said copending application Serial No. 123,231 insofar as making the seismic record sections more readable.

Figure 7:
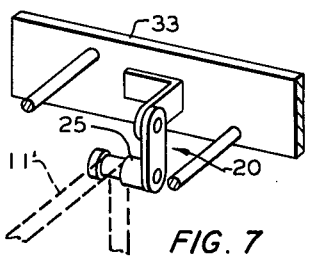
FIGURES 6 and 7 are views showing portions of FIGURE 5 in detail.

Referring again to the drawing, FIGURE 4, according to the subject invention a plurality of new tape index pins 25 are provided at the locus of the initial carriage position, one such pin for each of the tapes 11. These pins 25 can be mounted or disposed at the initial carriage position (i.e., at the intersection of the plane of frame 26 with the plane of steel band 62) in any suitable manner, one embodiment thereof being shown in FIGURE 5, and in detail in FIGURE 7, where such a pin is mounted on a pivotal bracket 29 fastened to the side of brace 33. By pulling tape 11 from takeup drum 13 on the other side of pin 16, for example with the fingers, it can be passed over pin 25. When this is done, the tape portion between pin 16 and carriage 12 will occupy the position shown by the broken line 11', and in this new position the tape merely passes over index pin 16 rather than being pulled around it.

In carrying out the invention, the processed time corrected traces of said copending application are first transcribed onto the blank tapes maintained within the analog device. To accomplish this, the tapes are strung over index pins 25, in the manner described above. The $t_h$ arm 18 can be swung on frame 26, by manipulating knob 125, to any position, other than that adjacent the initial carriage position where $t_h$ equals zero. When the tapes are thus strung over index pins 25 and the $t_h$ arms 18 are swung into intermediate position, solenoid 75 is energized to cause rod 70 to trip carriage latch 72, and cause carriage 12 to grab steel band 62 and be moved downward therewith, pulling the tapes over pins 25, thus resulting in the transcription of the processed time corrected data onto the machine tapes. After the carriage 12 returns, the next step is to playoff the data thus transcribed in such a manner as to restore the time relationship to the records pertaining at the physical attitude of the reflecting beds. Such a playoff operation results in a transcription of the seismic events at times equivalent to normal time as measured from seismometer position. This is done with a $t_h$ arm 18 on one side of the frame being adjusted to a larger value than that during the preceding recording operation and the $t_h$ arm 18 on the other side of the frame being adjusted to a smaller value than during the preceding recording operation. When the $t_h$ arms 18 are so set, solenoid 75 can be actuated so as to cause the carriage 12 to move downwardly to transcribe the data from the tapes, the tapes being pulled over pins 25. The exact position of the $t_h$ arms for this transcribing operation can be determined by several trials in order to get adjacent outside traces of adjacent records to coincide when the records are displayed side by side. The position of each magnetic head, of course, will be a linear function of the shotpoint to seismometer position for the particular trace threaded throught the magnetic head. Such displayed records can be reproduced photographically and a plurality of successive records, with the physical attitude of the reflecting beds restored as described, can be placed side by side to form a seismic record section, such as illustrated in FIGURE 3. Note that in FIGURE 3 the adjacent events $r_1$ and $r_2$ attributable to reflecting beds now lie in a position analogous to that of the reflecting beds from which they eminated, thus making such seismic record sections readily discernible, as compared to FIGURES 1 and 2.

Various modifications and alterations of this invention will become apparent to those skilled in the art from the foregoing discussion and accompanying drawing, and it should be understood that this invention is not to be limited unduly to that set forth herein for illustrative purposes.

I claim:

1. A method of restoring the physical attitude of subterranean reflecting beds to each of a plurality of processed seismic traces which have been corrected for normal time as measured from a single shotpoint, said method comprising the steps of recording from a plurality of transcribing stations said processed seismic traces onto a plurality of recording media; establishing normal time for each processed seismic trace as measured from each of a plurality of seismometer stations; moving the transcribing stations from their recording position a distance corresponding to the difference between the normal time of each seismic trace as measured from the shotpoint and the established normal time of each seismic trace as measured from each of the seismometer stations and passing the recording media past the said transcribing stations whereby the time occurrence of seismic events on said seismic traces will be the normal times as measured from the seismometer stations which recorded said seismic events.

2. A method for changing the time relationships of seismic events which have been recorded on seismic traces produced by a plurality of seismometers, said method comprising the steps of transcribing said traces onto a plurality of recording media; forming a plurality of seismic time triangles with each of said plurality of recording media representing that leg of a seismic time triangle representing the travel time from a shotpoint to each of said seismometers; passing the recording media past a plurality of transcribing stations at a nonuniform rate, said rate being inversely proportional to the average velocity between the shot image and each of said seismometers whereby the time of transcription of said seismic events onto the transcribing station is equivalent to normal time rather than reflection time; recording said seismic traces onto a second plurality of recording media; establishing the normal time for each seismic trace as measured from each of said plurality of seismometer stations; moving the transcribing stations from their recording position a distance corresponding to the difference between the normal time of the seismic trace as measured from the shotpoint and the established normal time of each seismic trace as measured from each of the seismometer stations and passing the second plurality of recording media past the said transcribing stations whereby the time occurrence of the seismic events on said seismic traces will be the normal time as measured from the seismometer stations which recorded said seismic events.

References Cited by the Examiner

UNITED STATES PATENTS

| | | | |
|---|---|---|---|
| 2,800,639 | 7/1957 | Lee | 340—15.5 |
| 2,858,523 | 10/1958 | Hawkins | 340—15.5 |
| 3,005,184 | 10/1961 | Savit | 340—15.5 |
| 3,134,958 | 5/1964 | Burns | 340—15.5 |

BENJAMIN A. BORCHELT, *Primary Examiner.*

SAMUEL FEINBERG, KATHLEEN H. CLAFFY,
*Examiners.*